United States Patent
So et al.

(10) Patent No.: US 10,534,741 B2
(45) Date of Patent: Jan. 14, 2020

(54) TRANSMITTING SIGNALS BETWEEN USB PORTS

(71) Applicant: Hewlett-Packard Development Company, L.P., Houston, TX (US)

(72) Inventors: Chi So, Houston, TX (US); Nam H Nguyen, Houston, TX (US); Chien-Hao Lu, Taipei (TW); Roger D Benson, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/097,807

(22) PCT Filed: Jul. 13, 2016

(86) PCT No.: PCT/US2016/042059
§ 371 (c)(1),
(2) Date: Oct. 30, 2018

(87) PCT Pub. No.: WO2018/013107
PCT Pub. Date: Jan. 18, 2018

(65) Prior Publication Data
US 2019/0121772 A1    Apr. 25, 2019

(51) Int. Cl.
*G06F 3/00* (2006.01)
*G06F 13/40* (2006.01)
(Continued)

(52) U.S. Cl.
CPC ...... *G06F 13/4068* (2013.01); *G06F 13/4282* (2013.01); *G10L 19/00* (2013.01); *G06F 2213/0042* (2013.01)

(58) Field of Classification Search
CPC .. G06F 13/4068; G06F 13/4282; G06F 13/00; G06F 13/4295; G06F 2213/0042; G10L 19/00
See application file for complete search history.

(56) References Cited

U.S. PATENT DOCUMENTS

| 6,058,441 A | 5/2000 | Shu |
| 7,627,708 B2 | 12/2009 | Bohm et al. |

(Continued)

FOREIGN PATENT DOCUMENTS

| CN | 204179435 U | 2/2015 |
| EP | 2924582 A2 | 9/2015 |
| TW | 201426321 A | 7/2014 |

OTHER PUBLICATIONS

How multiple USB devices connect to host devices. USB connectivity schematics., May 29, 2015, http://www.apc.com/site/support/us/en/faq/?page=content&country=ITB&lang=en&locale=.

(Continued)

*Primary Examiner* — Jing-Yih Shyu
(74) *Attorney, Agent, or Firm* — Brooks Cameron & Huebsch PLLC (US LC)

(57) ABSTRACT

Example implementations relate to transmitting signals via USB ports. For example, a system according to the present disclosure, may include a host module including a plurality of USB ports, a first expansion module, and a second expansion module. The first expansion module may include a first USB port and a second USB port. The first expansion module may receive a signal from the host module at a first USB port, and direct the signal to a second USB port. The first expansion module may transmit the signal to a second expansion module via a second USB port.

15 Claims, 4 Drawing Sheets

(51) Int. Cl.
*G06F 13/42* (2006.01)
*G10L 19/00* (2013.01)

(56) References Cited

U.S. PATENT DOCUMENTS

| | | | |
|---|---|---|---|
| 7,674,138 B2 | 3/2010 | Mori | |
| 8,135,883 B2* | 3/2012 | Monks | G06F 13/387 |
| | | | 710/38 |
| 9,465,764 B2* | 10/2016 | Ma | G06F 13/4045 |
| 2003/0135681 A1 | 7/2003 | Laity | |
| 2004/0015637 A1 | 1/2004 | Yau | |
| 2006/0056401 A1* | 3/2006 | Bohm | G06F 13/4022 |
| | | | 370/360 |
| 2006/0059293 A1* | 3/2006 | Wurzburg | G06F 13/4022 |
| | | | 710/313 |
| 2008/0126593 A1 | 5/2008 | Wang | |
| 2010/0077126 A1* | 3/2010 | Huang | H04L 49/101 |
| | | | 710/316 |
| 2011/0179201 A1 | 7/2011 | Monks et al. | |
| 2014/0101345 A1* | 4/2014 | Ranta | G06F 11/3051 |
| | | | 710/16 |
| 2014/0181353 A1 | 6/2014 | Ma | |
| 2015/0324314 A1* | 11/2015 | Morgan | G06F 13/4068 |
| | | | 710/308 |
| 2016/0170914 A1 | 6/2016 | Pethe | |
| 2016/0170929 A1* | 6/2016 | Pethe | G06F 13/102 |
| | | | 710/313 |

OTHER PUBLICATIONS

Universal Serial Bus 3.0 Specification Chapter 3-11 Nov. 12, 2008 pp. 41-440 XP055010091.

* cited by examiner

TRANSMITTING SIGNALS BETWEEN USB PORTS

BACKGROUND

A computing system may include a host module and a plurality of expansion modules. The plurality of expansion modules may be coupled to the host module in various ways for transmitting a signal from the host module to the plurality of expansion modules or among the plurality of expansion modules.

DETAILED DESCRIPTION

A computing system (e.g., a modular computing system) may include a host module and a plurality of expansion modules. A "modular computing system" refers to a computing system comprising a plurality of user-configurable modules. As used herein, a user-configurable module is referred to as an "expansion module." As such, a modular computing system may be capable of user configuration by adding, removing, and/or altering expansion modules. The computing system may allow a plurality of expansion modules to connect to a host module in various ways. In one example, the host module may include a single Universal Serial Bus (USB) port by which a plurality of expansion modules may be connected in series. In another example, the host module may include a plurality of USB ports and each module may be connected to the host module via a respective USB port of the plurality of USB ports. However, in such approaches, a modular computing system may undesirably experience a bandwidth shortage as a single USB port may not provide enough bandwidth to handle multiple modules. Further, a plurality of expansion modules that can be connected to the host module may be limited because a single USB port may provide a limited bandwidth.

Transmitting signals via USB ports, according to the present disclosure, describes a system and method to interleave a plurality of USB ports within each expansion module. As used herein, interleaving the plurality of USB ports within each expansion module refers to directing a signal from one USB port to another USB port of one expansion module. A system can, for example, include a host module including a plurality of USB ports, and a first expansion module including a first USB port and a second USB port. The first expansion module can receive a signal from the host module at the first USB port, direct the signal to the second USB port, and transmit the signal to a second expansion module via the second USB port. Advantageously, the modular computing system, as described herein, can allow a plurality of expansion modules to share bandwidth of a plurality of USB ports, not a single USB port, among other advantages. Put another way, sharing bandwidth of a plurality of USB ports may prevent overloading of a computing system data processing capabilities, such as when a plurality of expansion modules are connected and being used simultaneously, among other examples.

Figure 1:
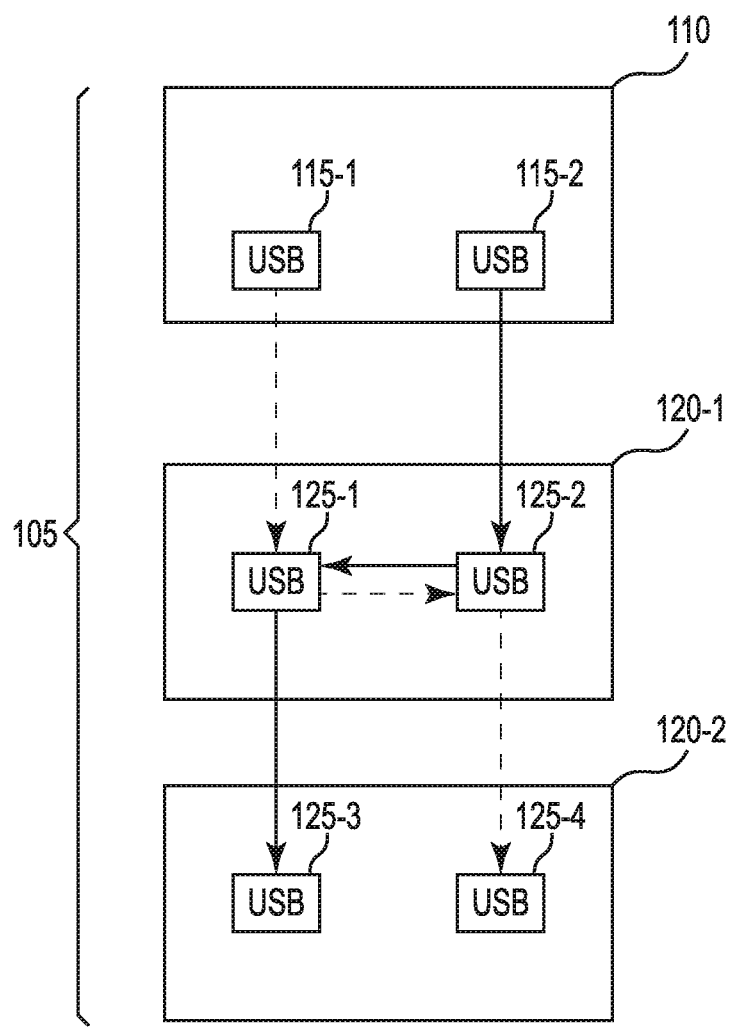
FIG. 1 illustrates a diagram of an example of a system for transmitting signals via USB ports according to the present disclosure.

FIG. 1 illustrates a diagram of an example of a system 100 according to the present disclosure. As illustrated in FIG. 1, the system 100 can include a host module 110, a first expansion module 120-1, and a second expansion module 120-2. The host module 110 and each expansion module can include a plurality of USB ports (e.g., USB ports 115-1, 115-2), as described in FIG. 1. For example, the host module 110 can include a plurality of USB ports 115-1 and 115-2, the first expansion module can include a first USB port 125-1 and a second USB port 125-2, and the second expansion module can include a plurality of USB ports 125-3 and 125-4.

Notably, examples are not limited to a particular number of expansion modules or USB ports. For example, the system 100 may include more or fewer than two expansion modules and each expansion module may include more or fewer than two USB ports.

The host module 110 can include the plurality of USB ports 115-1 and 115-2. In various examples, the host module 110 can couple the first expansion module 120-1 to the host module 110 via the plurality of USB ports 115-1 and 115-2. For example, as illustrated in FIG. 1, the host module can couple the USB port 115-1 to the first USB port 125-1 of the first expansion module 120-1. Likewise, the host module 110 can couple the USB port 115-2 to the second USB port 125-2 of the first expansion module 120-1.

The first expansion module 120-1 can include the first USB port 125-1 and the second USB port 125-2 to receive a signal from the host module 110. The first expansion module 120-1 may be configured such that a signal received, from the host module 110, at the first USB port 125-1, may be directed to the second USB port 125-2. The expansion module 120-1 may also be configured such that a signal received, from the host module 110, at the second USB port 125-2, may be directed to the first USB port 125-1. In both scenarios, the expansion module 120-1 may transmit the signal to the second expansion module 120-2.

In various examples, the first expansion module 120-1 can receive a signal from the host module 110 at a particular USB port. For example, the first expansion module 120-1 can receive the signal transmitted from the USB port 115-1 of the host module 110 at the first USB port 125-1. Likewise, the first expansion module 120-1 can receive the signal transmitted from the USB port 115-2 of the host module 110 at the second USB port 125-2.

In various examples, the first expansion module 120-1 can direct the signal from a particular USB port to a different USB port. For example, as illustrated in FIG. 1, the first expansion module 120-1 can receive the signal at the USB port 125-1 and direct the signal to the USB port 125-2. Likewise, the first expansion module 120-1 can receive the signal at the USB port 125-2 and direct the signal to the USB port 125-1. That said, the first expansion module 120-1 can transmit the signal to the second expansion module 120-2 via a particular USB port to which the signal is directed from a different USB port. For example, the signal received at the USB port 125-1 can be transmitted to the second expansion module 120-2 from the USB port 125-2. Likewise, the signal received at the USB port 125-2 can be transmitted to the second expansion module 120-2 from the USB port 125-1.

The second expansion module 120-2 can connect to the host module 110 via the first expansion module 120-1. For example, as illustrated in FIG. 1, the second expansion module 120-2 can couple the USB port 125-3 and the 125-4 to the first USB port 125-1 and the second USB port 125-2 as illustrated in FIG. 1, respectively. That said, the second expansion module 120-2 can receive the signal transmitted from the first USB port 125-1 at the USB port 125-3. Likewise, the second expansion module 120-2 can receive the signal transmitted from the second USB port 125-2 of the first expansion module 120-1 at the USB port 125-4. Although not shown, the second expansion module 120-2 can also direct the signal from one USB port to another USB port such that the signal received at a particular port can be transmitted to a next expansion module (not shown) via a different USB port, as described herein.

Although not shown, the system 100 may include a plurality of expansion modules in addition to the first expansion module 120-1 and the second expansion module 120-2. Although examples are not so limited, in various examples, the plurality of expansion modules may be coupled to the host module 110 in series. For example, a third expansion (not shown) module may be coupled to the second expansion module 120-2 to connect to the host module 110, and receive the signal from the host device via the second expansion module 120-2.

Figure 2A:
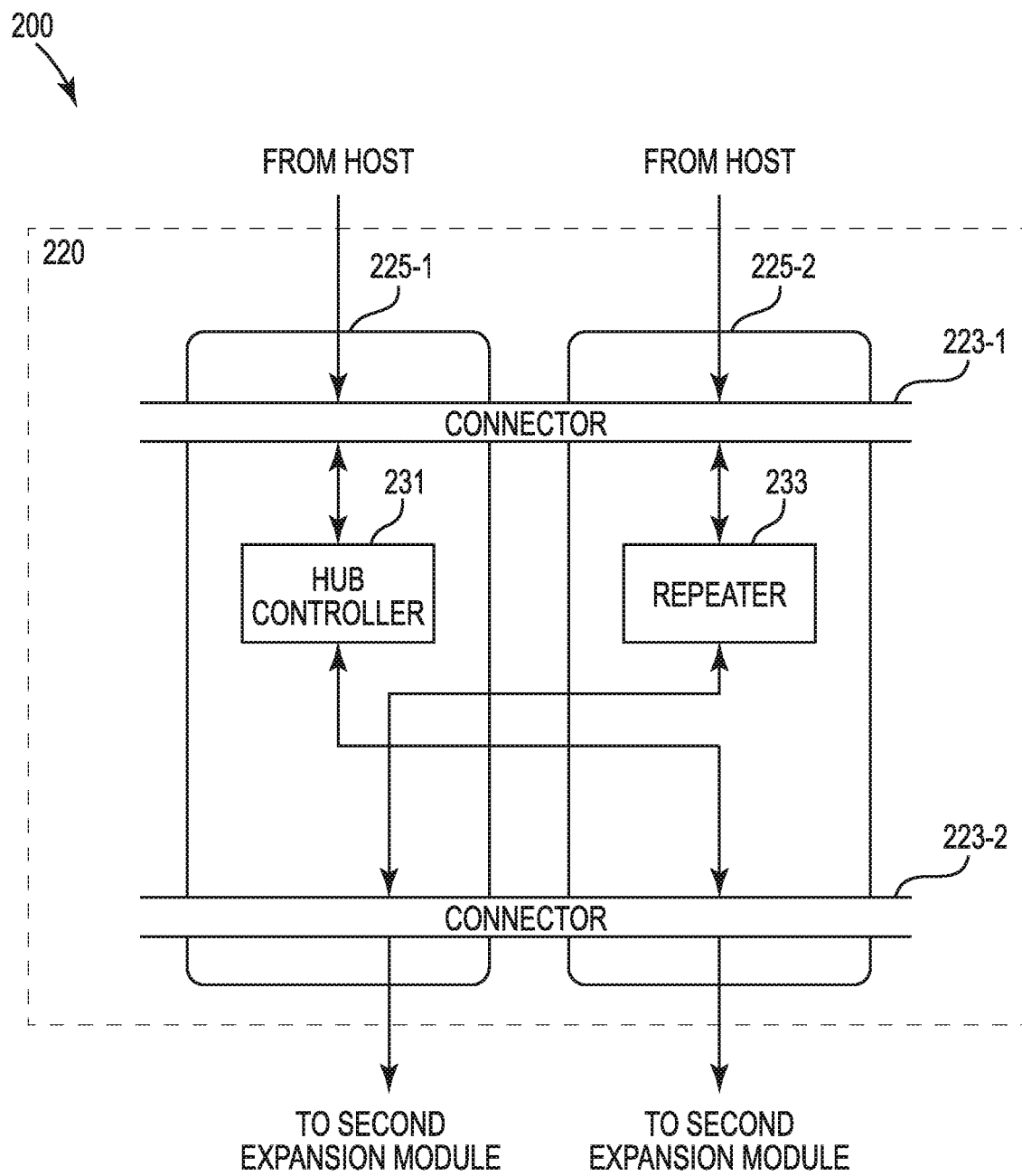
FIGS. 2A and 2B illustrate a diagram of an example of a system for transmitting signals via USB ports according to the present disclosure.
Figure 2B:
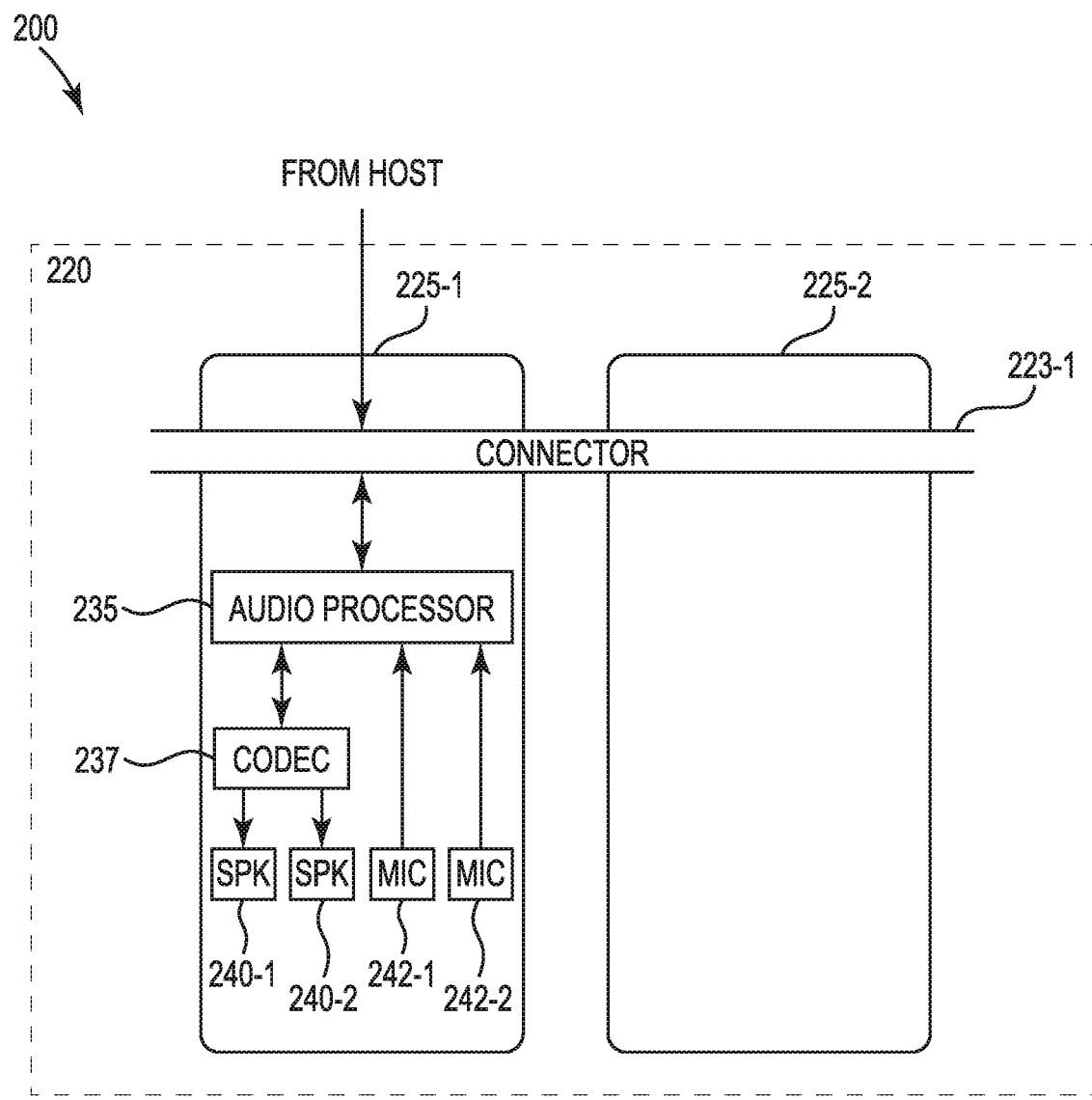

FIGS. 2A and 2B illustrate an example of a system 200 according to the present disclosure. The system 200 may include a host module (not shown) and a first expansion module. The host module is analogous to the host module 110 illustrated in FIG. 1. The first expansion module 220 illustrated in FIGS. 2A and 2B is analogous to those (e.g., expansion modules 120-1, and 120-2) illustrated in FIG. 1. For example, the first expansion module 220 can include a first USB port 225-1 and a second USB port 225-2 that are analogous to those (e.g., a plurality of USB ports 125-1, 125-2, 125-3, and 125-4) illustrated in FIG. 1. The first expansion module 220 can include at least one USB connector (e.g., a plurality of USB connectors 223-1 and 223-2) as illustrated in FIGS. 2A and 2B.

The host module (not shown) of the system 200 can transmit a signal to the first expansion module 220. As discussed with regard to FIG. 1, the host module can transmit the signal to the first USB port 225-1 of the first expansion module 220, as illustrated in FIG. 2. Likewise, as illustrated in FIG. 2, the host module can transmit the signal to the second USB port 225-2 of the first expansion module 220.

As illustrated in FIG. 2A, the first expansion module 220 can receive the signal at the first USB connector 223-1 via the first USB port 225-1, transmit the signal to the second USB connector 223-2 via the first USB port 225-1 and the second USB port 225-2, and receive the signal at the second USB connector 223-2 via the second USB port 225-2. That said, the first expansion module 220 can employ (e.g., use) both the first USB port 225-1 and the second USB port 225-2 in transmitting the signal from the first USB connector 223-1 to the second USB connector 223-2. For example, the first expansion module 220 can direct the signal transmitted via the first USB port 225-1 to the second USB port 225-2, as illustrated in FIG. 2A, such that the second USB connector 223-2 receives the signal via the second USB port 225-2.

In various examples, as illustrated in FIG. 2A, the first expansion module 220 can direct the signal from one USB port to another USB port via a USB hub controller 231 and a USB repeater 233. As used herein, a USB hub controller refers to a hardware device or chip that splits a single USB port into multiple USB ports. Further, as used herein, a USB repeater refers to a hardware device that repeats a USB signal to transmit the USB signal over the long distance as the USB signal may degrade over the distance.

For example, the first expansion module 220 can receive the signal at the first USB port 225-1, and transmit the signal to the USB hub controller 231 that directs the signal to the second USB port 225-2, as illustrated in FIG. 2A. For example, the first expansion module 220 can receive the signal at the second USB port 225-2, and transmit the signal to the USB repeater 233 that directs the signal to the first USB port 225-1, as illustrated in FIG. 2A.

In various examples, each expansion module may be of a particular type. For example, the first expansion module 220 can be an optical disk drive module. An optical disk drive refers to a hardware device that may include optical discs and uses laser light or electromagnetic waves within or near the visible light spectrum for reading or writing data to or from optical discs. In this example, the optical disk drive can be coupled to a USB bridge controller that couples the optical disk drive to the USB hub controller 231.

In some examples, the first expansion module 220 can receive the signal at the first USB connector 223-1 and transmit the signal to a plurality of module components. As used herein, the plurality of module components refers to hardware devices included in each particular expansion module. For example, an audio expansion module, as illustrated in FIG. 2B, may include an audio processor 235 as one of a plurality of module components. For example, as illustrated in FIG. 2B, the expansion module 220 can be an audio expansion module including an audio processor 235, audio compression/decompression module (CODEC) 237, a plurality of speakers 240-1 and 240-2, and a plurality of microphones 242-1 and 242-2, although examples are not so limited. That said, the audio expansion module, as illustrated in FIG. 2B, may receive the signal at the first USB connector 223-1, and transmit the signal to the plurality of speakers 240-1 and 240-2, and the plurality of microphones 242-1 and 242-2 via the audio processor 235 and the audio codec 237, as illustrated in FIG. 2B. In response to the receipt of the signal at the first USB connector 223-1, the audio expansion module may terminate the transmission of the signal, as described herein.

In various examples, although examples are not limited so, the plurality of USB connectors including the first USB connector 223-1 and the second USB connector 223-2, as illustrated in FIG. 1 and FIG. 2, can be a type-C USB connector. Each type of USB port may have a different power capacity. For instance, type-A USB ports may support discrete amounts of power to a device such as 2.5 watts (W), 4.5 W, 7.5 W, 12.5 W, and 15 W. In contrast, type-C USB ports may support many different amounts of power. For instance, a type-C USB port may support power supplies ranging from 0-15 W by default, and in some instances may support power supplies up to 100 W. Each type of USB port may also have a different shape, among other configurations. For example, as each side of the type-C USB port mirrors another side, the type-C USB port may be coupled in reversible manner, while type-A and type-B USB ports may be required to be coupled in a particular orientation. In various examples, a plurality of modules coupled to a type-C USB connector may share bandwidth of a plurality of USB ports included in the type-C USB connector. For example, although examples are not so limited, the type-C USB connector may include two USB 3.0 port each having bandwidth of 5 Gbps, and each of two modules, for instance, coupled to the type-C USB connector may fully employ the bandwidth of one USB 3.0 port. That said, each module may dictate the bandwidth of one USB 3.0 port rather than sharing the bandwidth of one USB 3.0 port among the two modules.

Although not shown in FIG. 2A, the system may include a second expansion module. For example, the first expansion module 220, upon receiving the signal at the second USB connector 223-2, can transmit the signal to the second expansion module (not shown). In various examples, the second expansion module can be analogous to the first expansion module 220, as described herein, such that the second expansion module may receive the signal at one USB connector of the second expansion module from the first expansion module 220, and transmit the signal to another USB connector of the second expansion module via a plurality of USB ports of the second expansion module. However, examples are not so limited. For example, as described herein, the second expansion module may receive the signal at one USB connector and terminate the transmission of the signal without further transmission.

Figure 3:
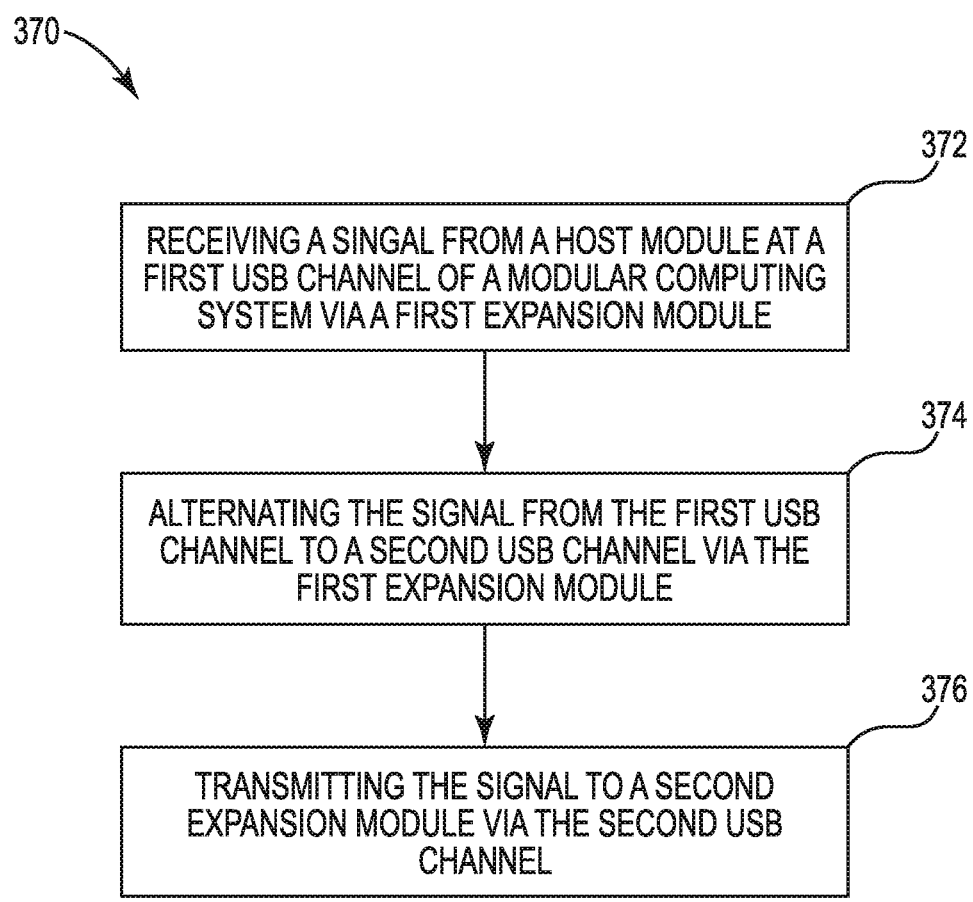
FIG. 3 illustrates a diagram of an example of a method for transmitting signals via USB ports according to the present disclosure.

FIG. 3 illustrates a flow diagram of an example of a method 370 according to the present disclosure. A host module, as described in the method 370, is analogous to the host module, as illustrated in FIGS. 1 and 2. For example, the host module can transmit the signal to the first expansion module that is analogous to the expansion module 120-1, 120-2, and 220, as illustrated in FIGS. 1 and 2. Although examples are not limited so, each expansion module described in the method 370 (e.g., a first expansion module and a second expansion module) can include a first USB port and a second USB port that are analogous to those (e.g., USB ports 125-1, 125-2, 125-3, 125-4, 225-1, and 225-2) illustrated in FIGS. 1 and 2. Further, a modular computing system as described in the method 370 can be analogous to the system 100 and 200 as illustrated in FIG. 1 and FIG. 2.

As illustrated at 372, the method 370 can include receiving the signal from the host module at the first USB channel of a modular computing system via a first expansion module. As used herein, a USB channel refers to a channel through which the signal is transmitted, and includes a plurality of USB ports coupled to each other. For example, although examples are not limited so, a first USB channel may include a plurality of first USB ports such as 115-1, 125-1, and 125-3 as illustrated in FIG. 1.

As illustrated at 374, the method 370 can include alternating the signal from the first USB channel to a second USB channel via the first expansion module. For example, as described herein, upon receiving the signal from the host module at the first USB channel of the modular computing system, the first USB channel can direct the signal to the second USB channel. Alternating the signal may include alternating the signal via a particular expansion module. For example, as described herein, the first USB channel may receive the signal from the host module at a first USB port of the first expansion module, and the first expansion module may direct the signal to a second USB port of the same expansion module. That said, alternating the signal from the first USB channel to the second USB channel may occur within a particular expansion module.

As illustrated at 376, the method 370 can include transmitting the signal to a second expansion module via the second USB channel. For example, as described herein, upon directing the signal from the first USB port to the second USB port, the first expansion module can transmit the signal to a second USB port of the second expansion module that is part of the second USB channel. That said, the second USB channel includes the second USB port of the first expansion module and the second USB port of the second expansion module coupled to each other.

Notably, while the method 370 includes alternating the signal from the first USB channel to the second USB channel, it should be noted that examples are not so limited. For example, the modular computing device may receive the signal at the second USB channel first, alternate to the first USB channel, and transmit the signal to the second expansion module via the first USB channel. That said, the first USB channel and the second USB channel can communicate (e.g., alternate a signal) bi-directionally.

In various examples, the method 370 may also include alternating the signal from one USB channel to another USB channel via the second expansion module. For example, the modular computing system may receive the signal at one USB channel via the second expansion module, and alternate the signal to another USB channel via the second expansion module. That said, alternating the signal from one USB channel to another USB channel may occur within the second expansion module. In some examples, as discussed in relation to FIG. 2B, the method 370 may include receiving the signal at a USB port of an audio expansion module, and terminating the transmission of the signal in response to the receiving of the signal by the audio expansion module (not shown).

Since many examples can be made without departing from the spirit and scope of the system and method of the disclosure, this specification merely sets forth some of the many possible example configurations and implementations. In the disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

What is claimed:
1. A system, comprising:
 a host module including a plurality of universal serial bus (USB) ports, and
 a first expansion module including a first USB port and a second USB port, the first expansion module to:
  receive a first signal from the host module at the first USB port;
  receive a second signal from the host module at the second USB port;
  direct the first signal received at the first USB port to the second USB port; and
  transmit the first signal and the second signal to a second expansion module via the second USB port.
2. The system of claim 1, wherein the plurality of USB ports includes a third USB port and a fourth USB port, and wherein the host module is to couple the first expansion module to the host module via the plurality of USB ports.
3. The system of claim 2, wherein the host module is to couple the first USB port to third USB port and the second USB port to the fourth USB port.

4. The system of claim 1, wherein the second expansion module is to connect to the host module via the first expansion module.

5. A system, comprising:
a host module to transmit a first signal and a second signal to a first expansion module; and
the first expansion module including a first USB connector and a second USB connector, the first expansion module to:
receive the first signal at the first USB connector via a first USB port;
transmit the first signal to a second USB connector via the first USB port;
receive the a second signal at the second USB connector via the second USB port; and
transmit the first signal and the second signal to a second expansion module via the second USB port.

6. The system of claim 5, wherein to transmit the signal to the second USB connector via the first USB port and the second USB port is to direct the signal from the first USB port to the second USB port.

7. The system of claim 5, wherein the first expansion module is to direct the signal via a USB repeater.

8. The system of claim 5, wherein the first expansion module is to direct the signal via a USB hub controller.

9. The system of claim 5, wherein each USB connector is a type-C USB connector.

10. The system of claim 5, wherein the system includes the second expansion module, the second expansion module to receive the signal from the second USB connector of the first expansion module.

11. The system of claim 10, wherein:
the first expansion module is an optical disk drive module; and
the second expansion module is an audio expansion module.

12. A method, comprising:
receiving a first signal from a host module at a first universal serial bus (USB) channel of a modular computing system via a first expansion module;
alternating the first signal from the first USB channel to a second USB channel via the first expansion module;
receiving a second signal from the host module at a second universal serial bus (USB) channel of the modular computing system; and
transmitting the first signal and the second signal to a the second expansion module via the second USB channel, wherein the first USB channel includes a plurality of first USB ports and the second USB channel includes a plurality of second USB ports, wherein each expansion module includes a first USB port and a second USB port.

13. The method of claim 12, wherein alternating the signal from the first USB channel to the second USB channel via the first expansion module includes directing the signal from a first USB port of the first expansion module to a second USB port of the first expansion module.

14. The method of claim 12, wherein the first USB channel of the modular computing system includes the plurality of first USB ports coupled to each other and the second USB channel of the modular computing system includes the plurality of second USB ports coupled to each other.

15. The method of claim 12, further comprising:
receiving the signal at an audio expansion module; and
terminating the transmission of the signal in response to the receiving of the signal by the audio expansion module.

* * * * *